United States Patent [19]

Nagata

[11] Patent Number: 5,325,138
[45] Date of Patent: Jun. 28, 1994

[54] CAMERA USING FILM WITH MAGNETIC RECORD PORTION

[75] Inventor: Toru Nagata, Tokyo, Japan

[73] Assignee: Canon Kabushiki Kaisha, Tokyo, Japan

[21] Appl. No.: 26,298

[22] Filed: Mar. 4, 1993

[30] Foreign Application Priority Data

Mar. 6, 1992 [JP] Japan ................................. 4-82988

[51] Int. Cl.⁵ ............................................. G03B 17/24
[52] U.S. Cl. ..................................... 354/106; 354/207
[58] Field of Search ....................... 354/106, 207, 173.1

[56] References Cited

U.S. PATENT DOCUMENTS 4,878,075 10/1989 Cannon ......................... 354/173.1

FOREIGN PATENT DOCUMENTS 4-171433 6/1992 Japan.
WO90/04204 4/1990 PCT Int'l Appl.

Primary Examiner—David M. Gray
Attorney, Agent, or Firm—Fitzpatrick, Cella, Harper & Scinto

[57] ABSTRACT

A camera is used with a film having a magnet record portion for each frame thereof. The camera is provided with a head portion for writing information in the magnetic record portion. When the film is rewound halfway up the end thereof, the head portion writes a plurality of specific information pieces in the record portion of each unexposed frame.

32 Claims, 14 Drawing Sheets

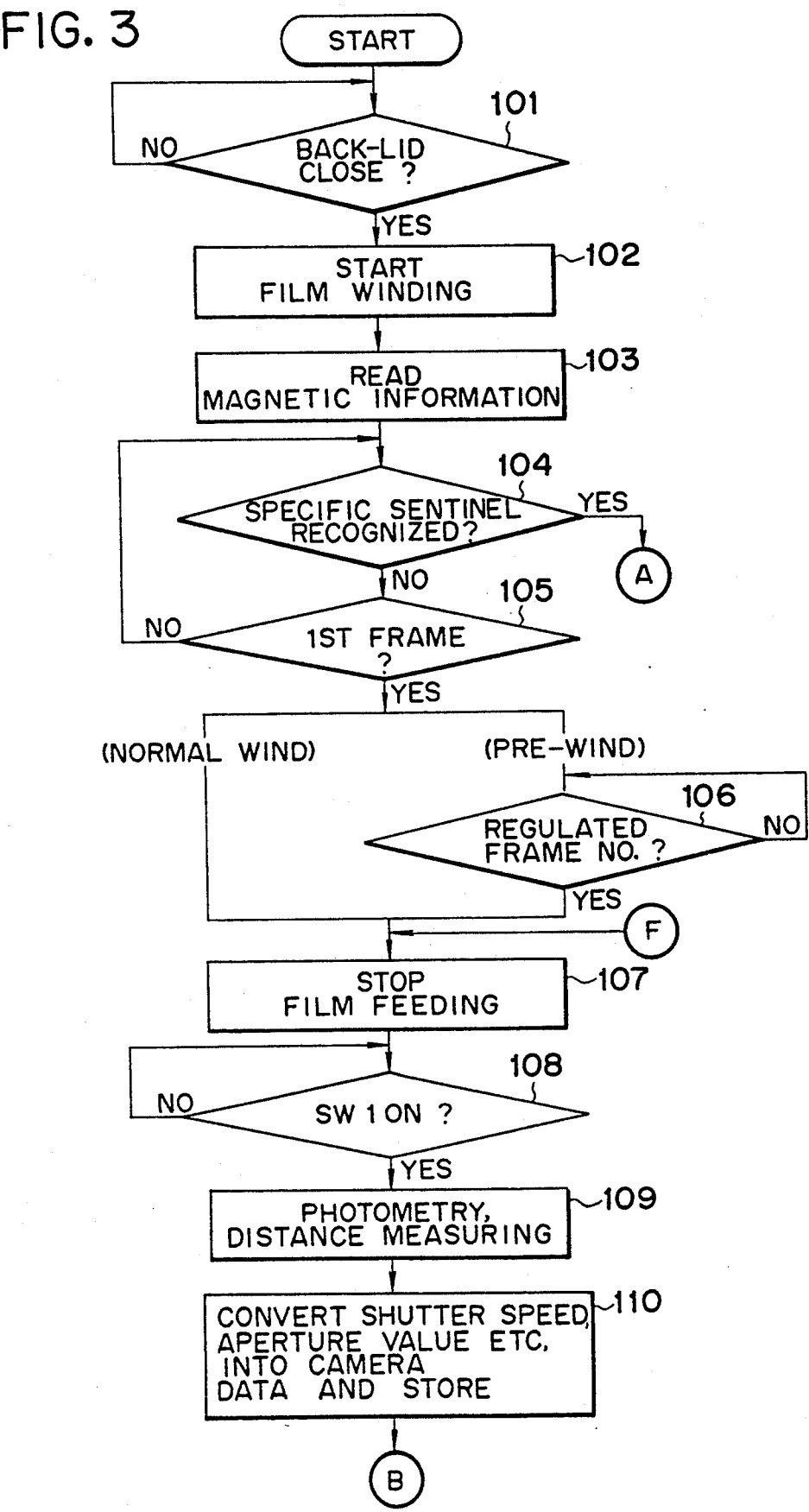

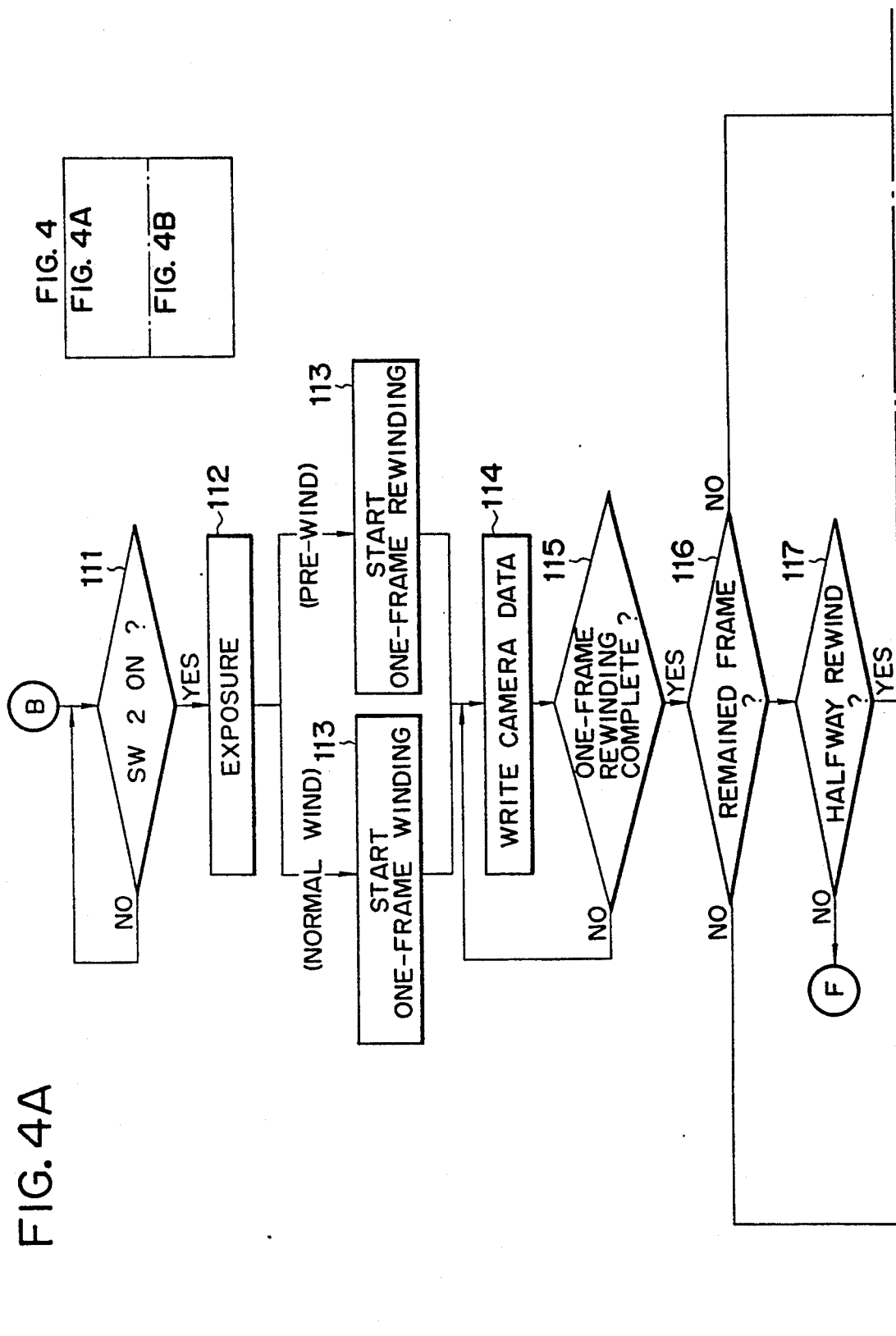

CAMERA USING FILM WITH MAGNETIC RECORD PORTION

BACKGROUND OF THE INVENTION

Field of the Invention

The present invention relates to an improvement in a camera using a film with a magnetic record portion, which is provided with a magnetic head for writing information in and reading the information out of the magnetic record portion on the film.

Related Background Art

U.S. Pat. No. 4,878,075 discloses a camera using a film cartridge enclosing even a tip end of a film therein, which permits halfway rewinding of film (halfway unloading of film cartridge) and reloading of the film cartridge.

In the proposal as described, the film is provided with a magnetic record portion of a transparent magnetic layer. The camera has a magnetic head for writing information into the magnetic record portion or for reading information preliminarily recorded in the magnetic record portion. When a film cartridge which was rewound halfway is reloaded, it is judged as follows whether each frame is exposed or unexposed.

(1) Specific information is recorded for a photographed frame. The specific information is referred to as a photograph flag, which will be described as a DEP flag (Double Exposure Prevention encodement). The magnetic head reads presence or absence of the DEP flag upon reloading of the cartridge. A frame with the DEP flag is judged as an "exposed" frame.

(2) Film data or information is preliminarily recorded on the film. The camera produces a DEP flag by overwriting specific information for each photographed frame on the film information or by simply erasing the film information. The magnetic head reads presence or absence of the DEP flag upon reloading of the cartridge. A frame with the DEP flag is judged as an "exposed" frame.

Such techniques are disclosed in the above U. S. Patent.

The above U.S. Patent further discloses a sequence of from film winding through exposed frame detection to unexposed frame positioning, executed upon reloading of the cartridge.

Further, WO 90/04204 discloses that film information, which is preliminarily recorded on a film by a film manufacturer, and camera information, which is recorded by a camera for each frame, consist of information blocks of "N bit ID sentinels + data characters" and that respective ID sentinels different from each other are assigned for identifying the camera information and the film information and for finding a data head. It also discloses that the ID sentinels for camera data or information different from those for film information are used as a DEP flag.

There are, however, the following serious problems in the above conventional examples, because an "exposed" frame is judged by presence or absence of the DEP flag.

(1) Since a single DEP flag is provided for each photographed frame, a very low reproduction error rate is required to detect the DEP flag.

(2) If a reproduction error should cause a failure of detection of the DEP flag, an "exposed" frame could be judged as unexposed, which results in double exposure.

Applicants filed Japanese Patent Application No. 2-297828, which disclosed a camera solving the above problems. The camera uses a film with a magnetic record portion for each frame, into which more film information pieces are preliminarily written than camera information pieces written by a magnetic head after completion of photographing. In the camera, there is means for judging an exposure state (whether a frame is exposed or unexposed), which comprises comparing means for comparing with a predetermined number the number of film information pieces left as written in the magnetic record portion of a frame positioned by one frame positioning means when a film cartridge encasing a film halfway used is reloaded, and means for judging that the frame is an exposed frame when the comparing means presents a comparison result that the film information pieces are less than the predetermined number. Accordingly, if the film information pieces are less than the predetermined number, a frame is Judged as exposed. (In such an arrangement, there is no possibility of judging an exposed frame as unexposed, though there is a possibility of judging an unexposed frame as exposed.)

The camera as proposed is very effective to solve the aforementioned problems, but has another problem of an increase in production cost of film, because the film information necessary for judging whether a frame is exposed or unexposed must be preliminarily recorded in the production process of films. The demand from camera side makes the film production complicated and increases the production cost of film.

SUMMARY OF THE INVENTION

It is an object of the present invention in one aspect thereof, taking the above points into account, to provide a camera using a film with a magnetic record portion, which can avoid the increase in production cost of film used therein by omitting the prerequisite of information record, which is used for judging whether a frame is unexposed or exposed, in the magnetic record portion during production process of films.

Another aspect of the present invention is directed under the above object to providing a camera in which specific information record instructing means is provided for driving a magnetic head to record plural pieces of specific information for each unexposed frame in the film when the film is rewound under an instruction from halfway rewinding means.

Another aspect of the present invention is to provide a camera which, when a film in which the plural pieces of specific information are written by the camera for each unexposed frame is reloaded, can find a head of unexposed frames, based on the specific information.

Further objects of the present invention will be apparent from the following description of the embodiments of the invention with reference to the accompanying drawings.

BRIEF DESCRIPTION OF THE DRAWINGS

FIG. 3 is a flowchart to show a part of an operation of the camera in the first embodiment according to the present invention;

FIG. 4, comprising FIGS. 4a and 4b, is a flowchart to show another part of the operation to follow the flowchart of FIG. 3;

DETAILED DESCRIPTION OF THE PREFERRED EMBODIMENTS

FIG. 1 to FIG. 9 show a first embodiment according to the present invention.

Figure 1:
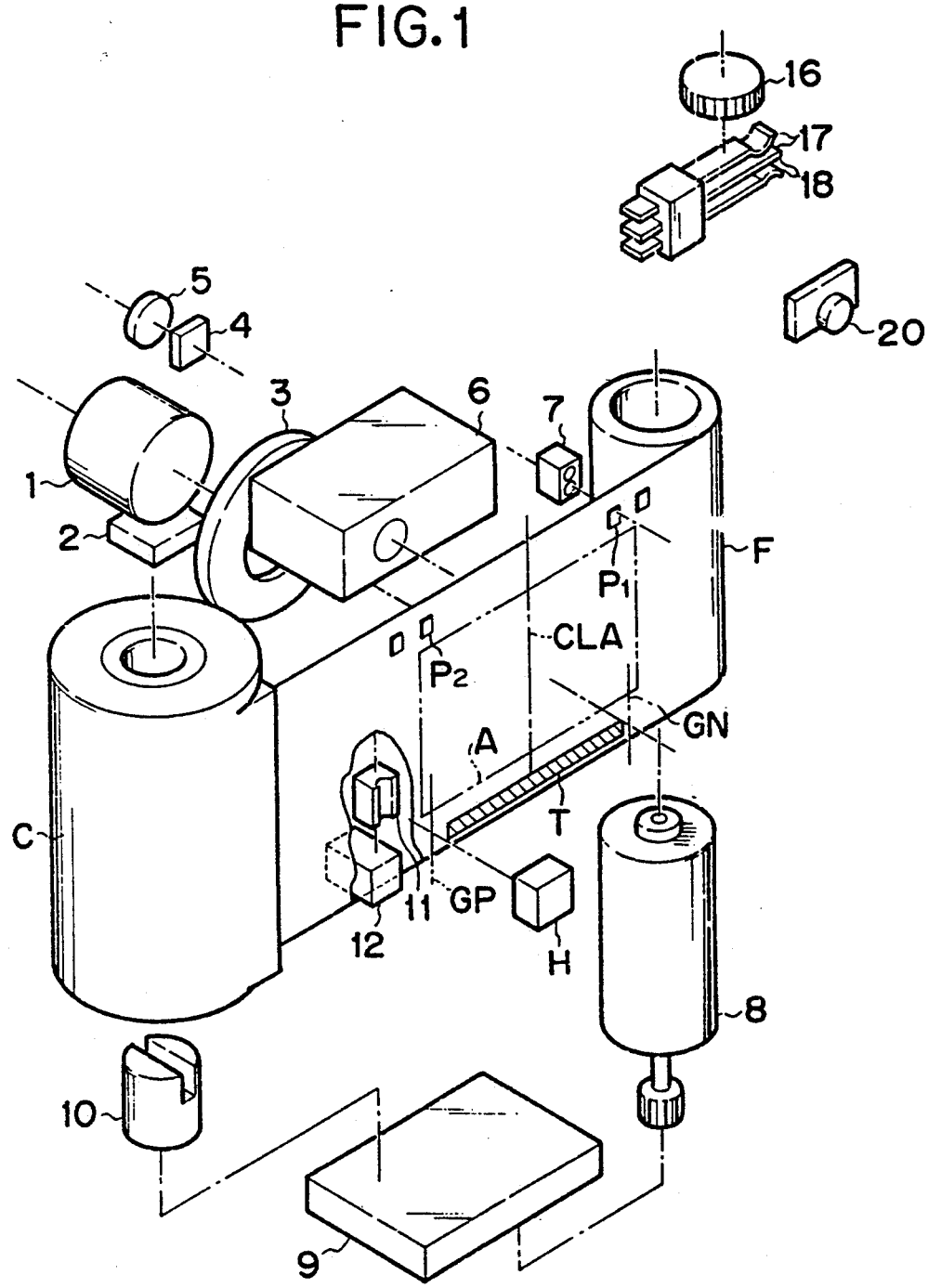
FIG. 1 is a perspective view to show a mechanical structure of a camera in a first embodiment according to the present invention.

FIG. 1 is a perspective view to show a structure of main part of a camera. In FIG. 1, reference numeral 1 designates a photo-taking lens, 2 a lens actuator for driving the photo-taking lens 1 and a lens encoder for generating a lens position signal, 3 a lens shutter, 4 a photomerry sensor for AE, 5 a lens for determining a light acceptance angle of the photomerry sensor 4, 6 a block enclosing a distance measuring sensor and a finder, 7 a photo reflector for detecting perforations $P_1$, $P_2$ of a film F to generate a signal for positioning a frame in the film F, 8 a film feed motor located in a spool, 9 a gear train for speed reduction and for switching between winding and rewinding, and 10 a rewinding fork.

Alphabetical character C denotes a film cartridge storing the film with a tip end of the film being exposed to the outside, F the film provided with a magnetic record portion T on the base side, $P_1$, $P_2$ the perforations corresponding to a photographic screen A, and H a magnetic head for writing information in the magnetic record portion T on the film F or for reading the information out of the magnetic record portion T. Numeral 11 represents a pad for pressing the film F toward the magnetic head H, having a recess for enhancing adherence between the film F and a head gap in the central portion thereof. Numeral 12 denotes a pad position control mechanism for urging the pad 11 against the magnetic head H through the film F only upon film feed.

FIG. 1 is drawn under a presumption that the camera is of a so-called prewind type in which the film is fully wound up prior to photographing and photographing is carried out while rewinding the film frame by frame. Thus, the magnetic head H press-contacts with the pad 11 on the GP line on the film F. In case of a camera of normal wind type, they are to be located at a position symmetric to the GP line with respect to the screen center CLA, that is, on the GN line.

Numeral 16 is a release button, 17 a switch (SW1) for start of photomerry and for start of distance measurement, 18 a switch (SW2) for starting a sequence of shutter opening and film feed, and 20 a rewind switch for halfway rewinding.

Figure 2:
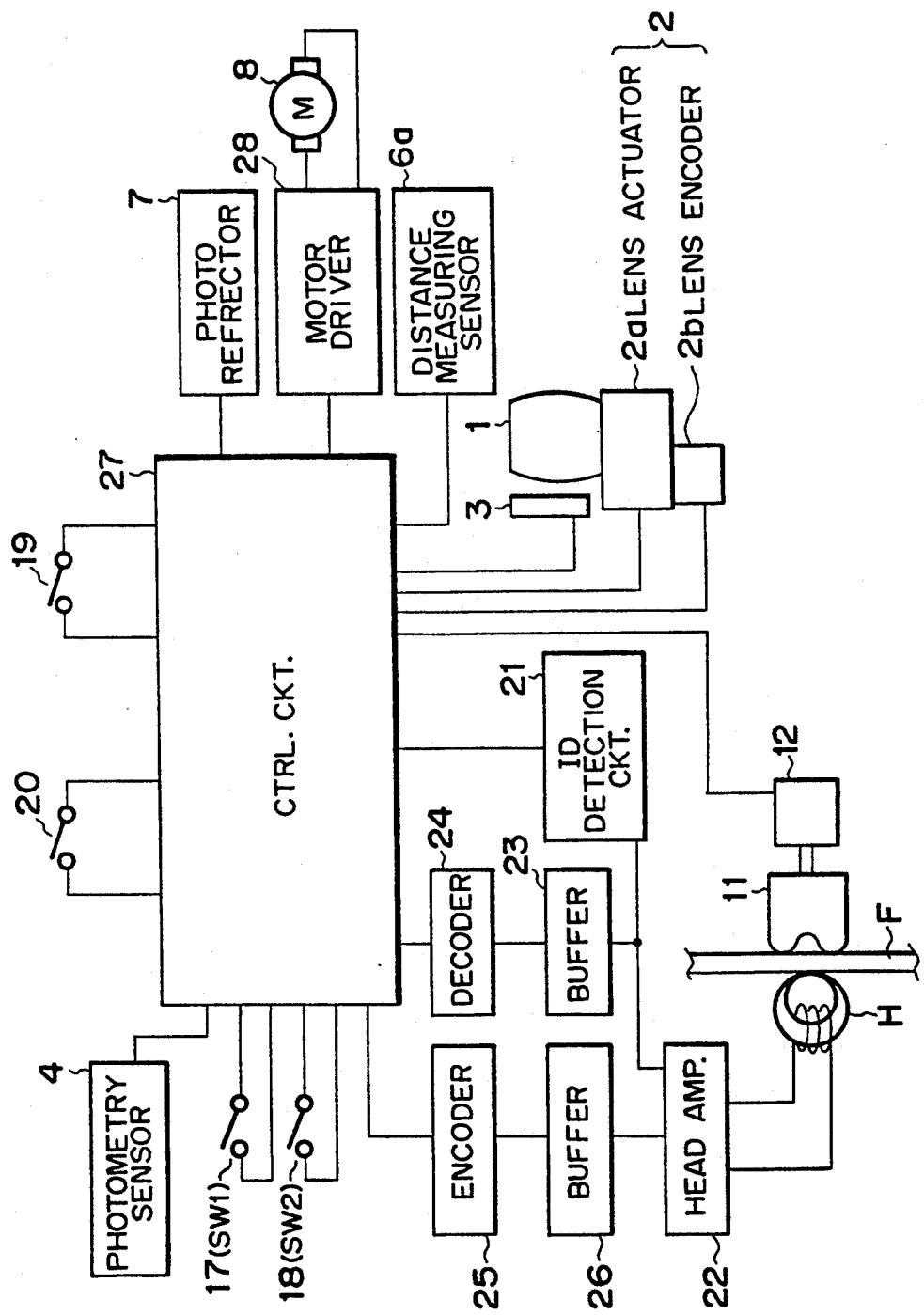
FIG. 2 is a block diagram of the camera as shown in FIG. 1.

FIG. 2 is a block diagram to show a schematic structure of the camera including parts relating to the present invention, and the same elements or parts are given the same reference numerals as those in FIG. 1.

In FIG. 2, numeral 19 designates a back lid switch for detecting closure of a back lid, 21 an ID detection circuit for detecting ID sentinels in film information, 22 a head amplifier for amplifying a signal from the magnetic head H, 23 a buffer, 24 a decoder, 25 an encoder, 26 a buffer, 27 a control circuit composed of a micro computer and others for executing sequence controls of respective circuits, and 28 a motor driver for driving the film feed motor 8.

Figure 4B:
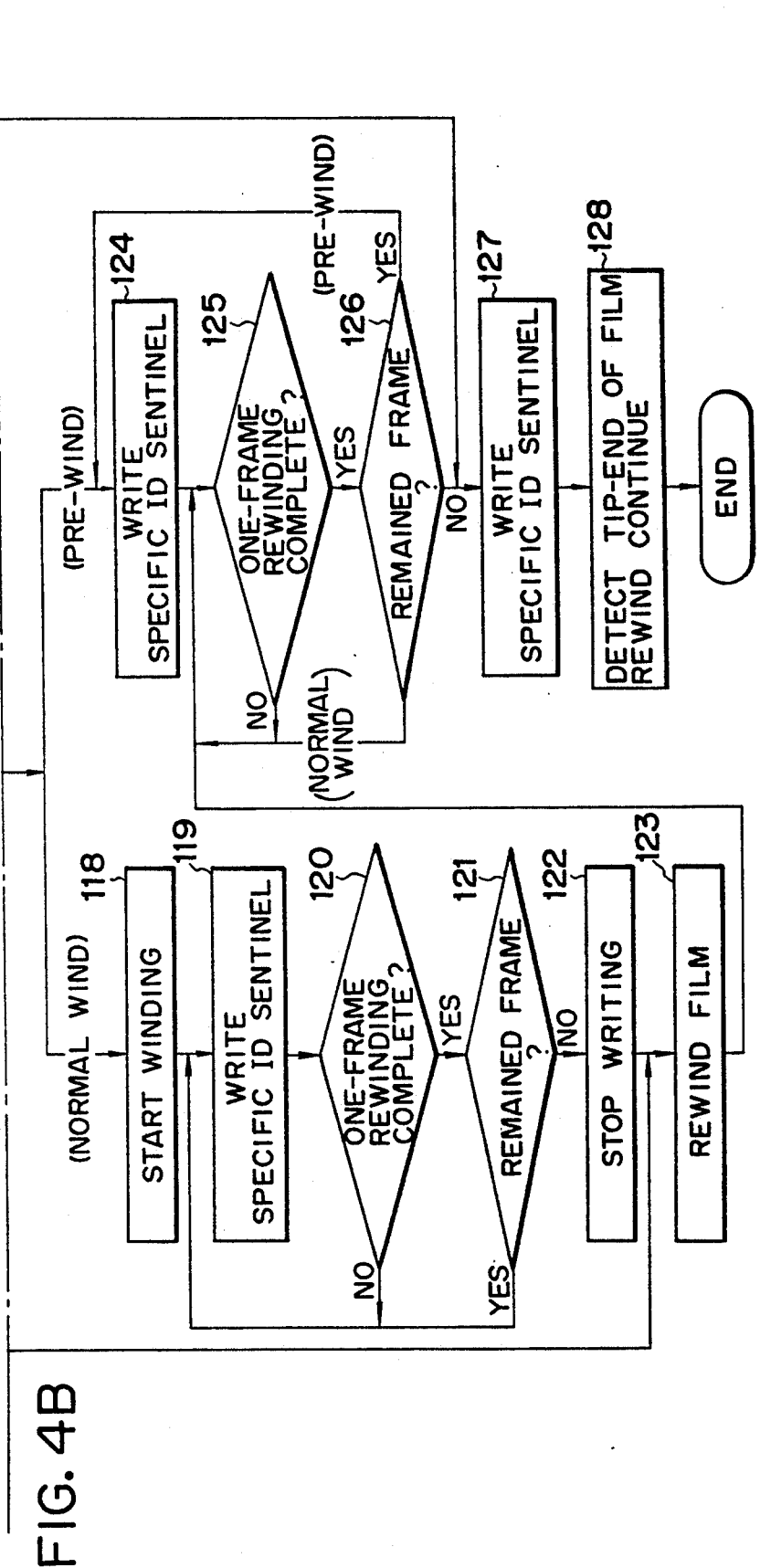

An operation of the camera as so arranged is next explained with a flowchart as shown in FIG. 3 and FIG. 4. In the description of the operation, there are different steps explained in parallel between the camera of prewind type and the camera of normal wind type.

When a film cartridge C is loaded in the camera and when the back lid is closed, which is judged by detection of turn-on of the back lid switch 19, the flow proceeds from Step 101 to Step 102, at which the film feed motor 8 is driven through the motor driver 28 to start winding the film F.

If the film cartridge should be once used halfway up the end of the film, the magnetic head H would read during the film winding specific ID sentinels (information head signal), which were recorded in the magnetic record portion T at the tip end portion of the film F during film halfway rewinding in a manner as described later. An output of the magnetic head H is amplified by the head amplifier 22 to be A/D-converted. The A/D-converted signal is input into the ID detection circuit 21, where N bit specific ID sentinels, for example specific data of "10000000", is detected. The detection output is input into the control circuit 27 and the specific ID sentinels are counted.

If an unused film cartridge is loaded, there is no specific ID sentinel recorded in the tip end portion of the film F. For example, if there is a regulated frame number of film recorded, the magnetic head H reads the number, an output thereof is amplified by the head amplifier 22 to be A/D-converted, the A/D-converted signal is transferred to the buffer 23, and thereafter the signal is decoded by the decoder 24 to be transferred to the control circuit 27. In the present embodiment, the specific ID sentinels are recorded in the film tip end portion as well during the halfway rewinding of the film F, which could cause inability of reading out the regulated frame number of a reloaded film. Therefore, the specific ID sentinels are to be recorded in a portion excluding the portion in which data including the regulated frame number is recorded.

Figure 5:
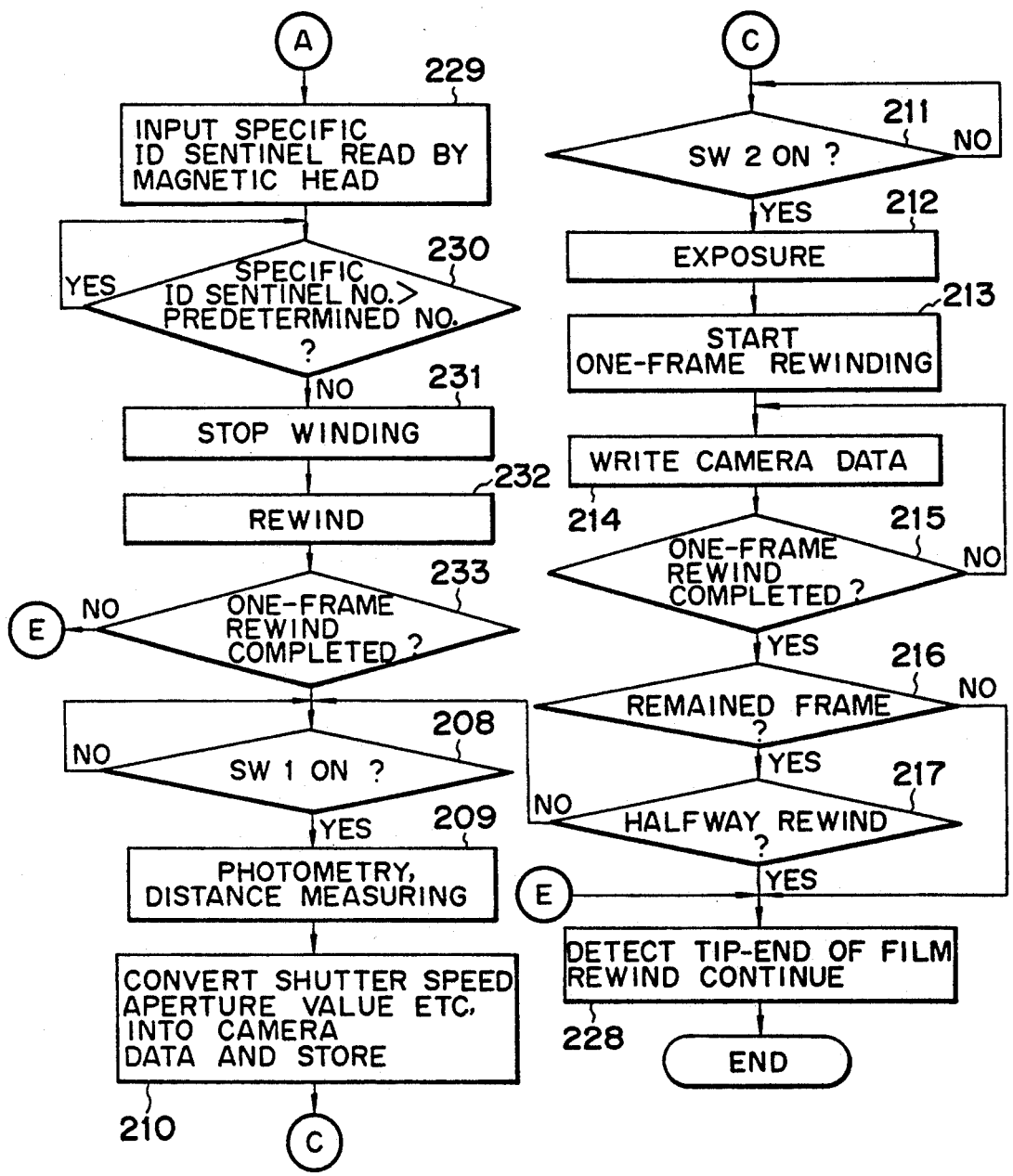
FIG. 5 is a flowchart to show still another part of the operation to follow FIG. 3, which is to be executed if the camera of FIG. 1 is of prewind type.
Figure 6:
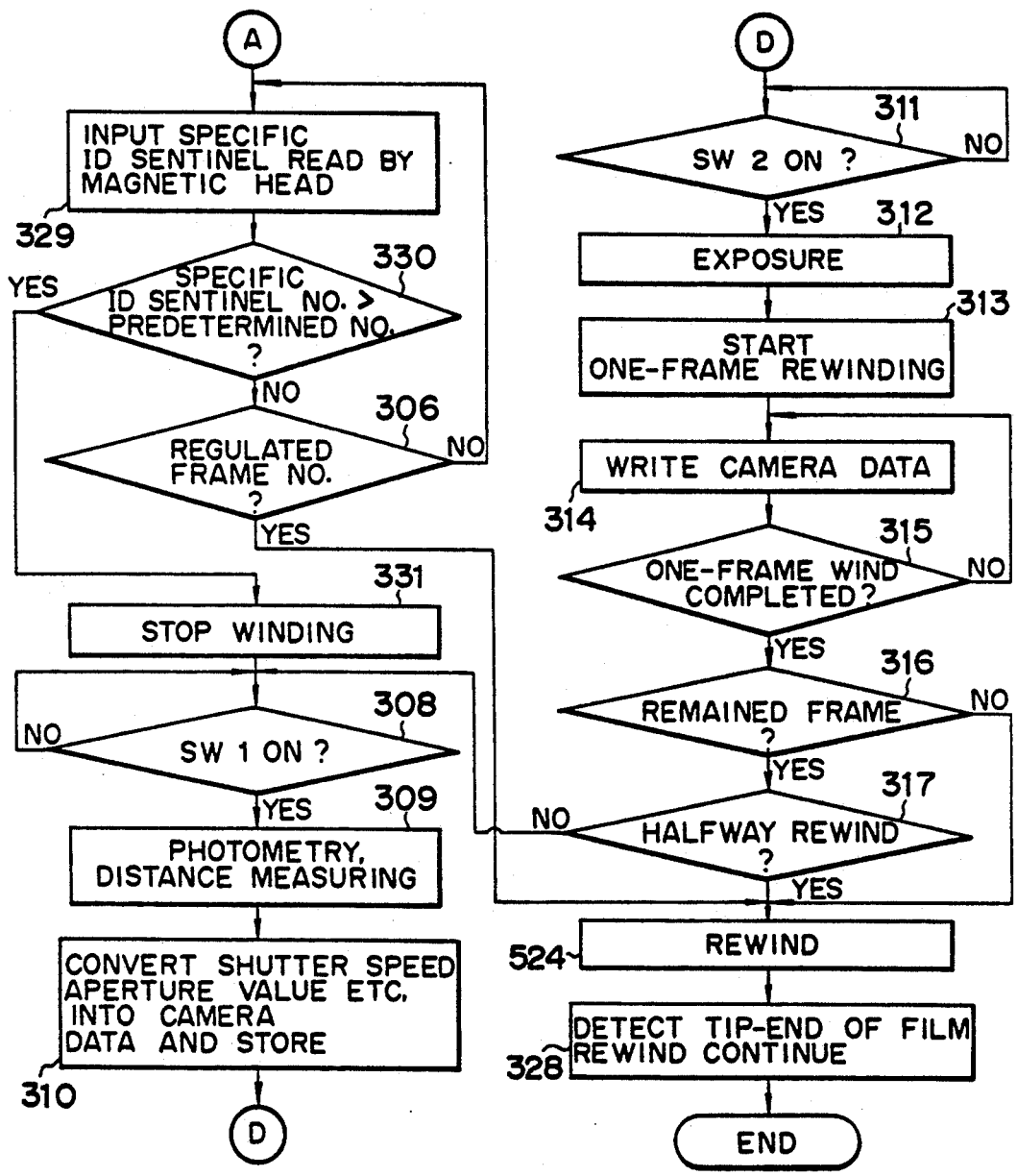
FIG. 6 is a flowchart to show another part of the operation to follow FIG. 3, which is to be executed if the camera of FIG. 1 is of normal wind type.

It is judged at next Step 104 and Step 105 whether the specific ID sentinels are present before the first frame in the film F. If there is are any detected, it is judged that a film cartridge once or more times used is reloaded. In case of the camera of prewind type, the flow Goes to Step 229 as shown in FIG. 5, while in case of the camera of normal wind type the flow Goes to Step 329 as shown in FIG. 6. On the other hand, if there is no specific ID sentinel detected before the first frame in the film F, it is judged that an unused film cartridge is loaded. Then, in case of the camera of prewind type, the flow proceeds to Step 106 to judge whether the film is wound up to the regulated frame number having been read. When it is judged that the regulated frame number is reached, that is, when the film feed up to the final frame is finished and it is judged that the final frame has reached an aperture position of the camera, the flow goes to Step 107. In case of the camera of normal wind type, the flow directly Goes to Step 107.

At Step 107, the first frame to be exposed is located at the aperture position of the camera in either type of camera, and the drive of the film feed motor 8 is thus interrupted to stop the film winding.

It is judged at Step 108 whether the switch SW1 is on. If the switch SW1 is on, the flow goes to Step 109 to carry out respective operations of photomerry and distance measurement. At next Step 110, a shutter speed and an aperture value obtained by the photomerry and distance measuring operations are converted into pieces of camera data, and the converted camera data pieces are transferred to the encoder 25.

The encoder 25 encodes the thus-transferred camera data pieces, and the encoded data is stored in the buffer 26.

It is judged at next Step 111 whether the switch SW2 is on. If it is Judged that the switch SW2 is on, the flow goes to Step 112 to perform the well-known exposure operation.

In detail, the control circuit 27 receives a lens position signal through a lens actuator 2a from a lens encoder 2b, and provides the lens actuator 2a with a stop command when the photo-taking lens 1 comes to a position corresponding to the distance measurement information obtained at Step 109 so as to stop the drive of the photo-taking lens 1 or the focus operation. Almost at the same time, the shutter 3 is opened for a time determined by the output of the photomerry sensor 4 at Step 109, and is then closed.

After completion of the above exposure operation, the film F is wound by one frame in case of the camera of normal wind type, while the film F is rewound by one frame in case of the camera of prewind type, at Step 113. Then at Step 114, the magnetic head H is driven to write in the magnetic record portion T of the film F the camera data, which was stored through the head amplifier 22 in the buffer 26 during the film feed in the form of a data character string beginning with N bit ID sentinels, for example "00000000", different from the specific ID sentinels as detailed later. It is Judged at Step 115 from the output of the photo reflector 7 whether feed of the photographed frame is completed. If it is judged that the feed of the photographed frame is completed, the flow proceeds to Step 116 to judge whether there is any unexposed frame in the film F (whether a remaining frame is present). If there is any, the flow goes to Step 117. At Step 117, it is judged from the state of the rewind switch 20 whether the halfway rewinding is instructed. If there is no halfway rewinding instruction, the flow returns to Step 107 to prepare for the next photographing.

If there is no remaining frame in the film F at Step 116, that is, if it is judged that all frame have been exposed for photographing, the flow goes to Step 127 in case of the prewind type. In case of the normal wind type, the flow goes through Steps 123, 125, 126 to Step 127 to write the specific ID sentinels again, and then goes to Step 128 to continue rewinding the film F until no serial outputs are input from the photo reflector 7, or until the film tip end portion passes through the position of the photo reflector 7. As a result, the film is in a state in which only the film tip end portion remains outside the film cartridge C. If the film cartridge is of a type in which the film tip end portion can be pulled out of the cartridge by rotation of the fork 10, the film may be rewound such that the film tip end portion is also stored inside the cartridge.

By the above operation, the specific ID sentinels are recorded in the tip end portion of the film F in which all frames have been exposed for photographing. This is for preventing erroneous double exposure even in the case that a film cartridge in which all frames have been exposed for photographing should be reloaded.

If it is Judged at Step 117 that the halfway rewinding is instructed, the following processes are carried out.

(1) In case of the camera of normal wind type:

Winding of the film F is first started at Step 118, and simultaneously the magnetic head H starts writing the specific ID sentinels at Step 119. This sequence is continued as long as the one frame winding end is detected at next Step 120 and it is judged at Step 121 that there is an unexposed frame in the film F. In other words, the specific ID sentinels are written for each of all unexposed frames. Once it is Judged at Step 120 that there is no remaining frame, the flow goes to Step 122 to stop the writing operation, and then goes to Step 123 to start rewinding the film F. This sequence is continued as long as the one frame rewinding end is detected at next Step 125 and it is Judged at Step 126 that there is a photographed frame. When it is Judged at Step 126 that there remains no photographed frame, the flow goes to Step 127 to write the specific ID sentinels in the film tip end portion as well. Further, the flow goes to Step 128 to continue rewinding the film F until no serial outputs are input from the photo reflector 7, that is, until the film tip end portion passes through the position of the photo reflector 7. As a result, the film is in a state that only the film tip end portion remains outside the film cartridge C, as described above.

(2) In case of the camera of prewind type:

Keeping on the film rewinding which was started at Step 113, the flow goes to Step 124 to write the specific ID sentinels, and then goes to Step 125. After that, the writing of the specific ID sentinels is continued as long as the one frame rewinding end is detected at Step 125 and it is Judged at Step 126 that there remains a photographed frame, in the same manner as in the normal wind type. In other words, the specific ID sentinels are written for each of all unexposed frames. After that, when it is Judged at Step 126 that there remains no photographed frame, the flow goes to Step 127 to write the specific ID sentinels in the film tip end portion as well in the same manner as described. Further, the flow goes to Step 128 to continue rewinding the film F before the film tip end portion passes through the position of the photo reflector 7. As a result, the film is in a state that only the film tip end portion remains outside the film cartridge C, similarly as in the above case.

By either of the above processes, the specific ID sentinels are recorded on the unexposed frames and on the tip end portion in the film F which has been rewound halfway up the end.

The pad 11 is urged against the magnetic head H by the pad position control mechanism 12 only during movement of the film F to make the reading and the writing of magnetic information secure, though not explained in the above description.

The following explains an operation executed when the film cartridge which was rewound halfway (taken out halfway) at Step 117 (or the film cartridge storing a film used up to the middle) is again loaded in the camera.

The same operation from Step 101 to Step 104 in FIG. 3 is carried out in this case.

In detail, when the back lid is closed after the film cartridge C is loaded in the camera, the flow Goes from Step 101 to Step 102 to start winding the film F. At next Step 103, the magnetic head H reads during the film winding the specific ID sentinels which were recorded in the magnetic record portion T at the tip end portion of the film F during the film halfway rewinding as described, and a number of the specific ID sentinels is detected by the ID detection circuit 21 to be counted by the control circuit 27. Some specific ID sentinels would be detected at Step 104 in this case. Then, the flow goes to Step 229 as shown in FIG. 5 in case of the camera of prewind type, while the flow goes to Step 329 as shown in FIG. 6 in case of the camera of normal wind type as described above.

An operation to follow in each of the types will be explained with a flowchart as shown in FIG. 5 or in FIG. 6. In the flowcharts of FIG. 5 and FIG. 6, steps having the same two digits from the lowest as those in FIG. 3 and FIG. 4 show the same steps as in FIG. 3 and FIG. 4, and, therefore, an explanation is omitted here.

FIG. 5 is a flowchart to show a process after Step 104 as described above in the camera of prewind type when a film cartridge having a film once used halfway is reloaded.

At Step 229, in the same manner as at prior Step 103, the magnetic head H reads the specific ID sentinels on the magnetic record portion T in the film F during film winding, and the specific ID sentinels detected by the ID detection circuit 21 are counted for each frame. At next Step 230, a number of the specific ID sentinels included in a frame is compared with a predetermined number as a threshold value for determining whether each frame is "exposed" or not. This step is repeated as long as a detected frame has specific sentinels of "ID sentinel number > the predetermined number". Once a frame is detected with "ID sentinel number ≦ the predetermined number", it is Judged that the frame is "exposed", and the flow goes to Step 231 to inhibit the drive of the film feed motor 8 so as to immediately stop the film winding. (A method to judge whether a frame is exposed will be described later.)

The film feed motor 8 is driven in the reverse direction at next Step 232 to start rewinding the film. It is judged at next Step 233 whether one frame rewinding is completed. If no completion of one frame rewinding should be recognized, the flow goes to Step 228 under a judgement that the film cartridge with all frames having been exposed is erroneously reloaded and therefore that the film rewinding is completed up to the final frame photographed. In contrast, when it is judged at Step 233 that the one frame rewinding is completed, a process below Step 208, which corresponds to the process below Step 108 in FIG. 3, is carried out, judging that an unexposed frame is located at the aperture position of the camera.

The judgement at above Step 230 is described in detail below. The control circuit 27 counts a number of specific ID sentinels recorded for each frame in film winding. If a frame is "unexposed", the magnetic head H could detect all specific ID sentinels in one frame. For example, if there are fifteen specific ID sentinels in one frame, all fifteen specific ID sentinels should be detected. On the other hand, if a frame is "exposed", a number of detectable specific ID sentinels would decrease (for example to nine sentinels), because the camera data such as the shutter speed and the aperture value is overwritten on at least a part of the sentinels. (Since there is a possibility that the film cartridge is reloaded more than once, the operation flow includes such a case. The number of specific ID sentinels is of course "0" in the first loading.) Accordingly, the control circuit 27 judges that the frame is "exposed" if the number of specific ID sentinels is not more than the predetermined number, for example nine in the above example, and the flow proceeds from Step 230 to Step 231 to immediately stop the film winding and perforation detection, which is input for positioning a frame, though not explained above. Then, a process below Step 232 is carried out.

Next explained with FIG. 6 is an operation of the camera of normal wind type executed when a film cartridge having a film used halfway is reloaded.

The operation of the normal wind type camera is different from that of the prewind type camera as shown in FIG. 5 in the following points. As long as it is Judged at Step 330 that "specific ID sentinel number ≦ the predetermined number", that is, that a frame is "exposed", and it is judged at Step 306 that the number of frames has not reached the "regulated frame number" yet, the process at Step 329 is repeated. When it is Judged that "specific ID sentinel number > the predetermined number", that is, that a frame is unexposed, the flow goes to Step 331 to stop winding the film F, and a process below Step 308, which corresponds to the process below Step 108 in FIG. 3, is then carried out.

If it is judged at Step 306 that all frames are exposed the flow goes to Step 524 below Step 317 under a judgement that a film cartridge with all frames having been exposed is erroneously reloaded and therefore that the film winding is completed up to the final frame photographed. Then, all frames are rewound. After completion of the rewinding the flow goes to Step 328 at which the same process as Step 128 is carried out.

Figure 7:
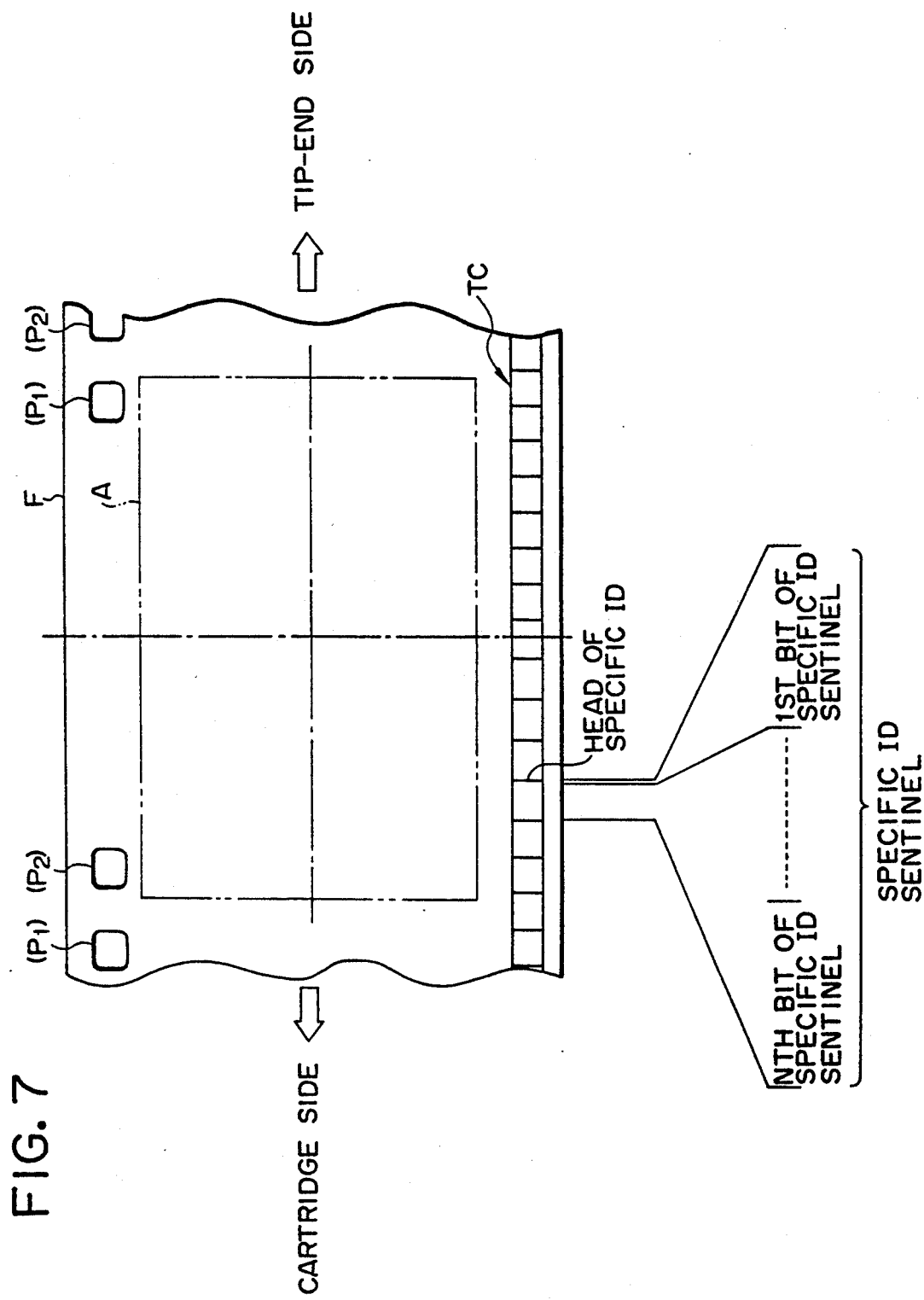
FIG. 7 is a drawing as seen from the base surface to show an arrangement of an information track, and camera record data recorded on an unexposed frame after halfway rewinding, in the film of FIG. 1.
Figure 8:
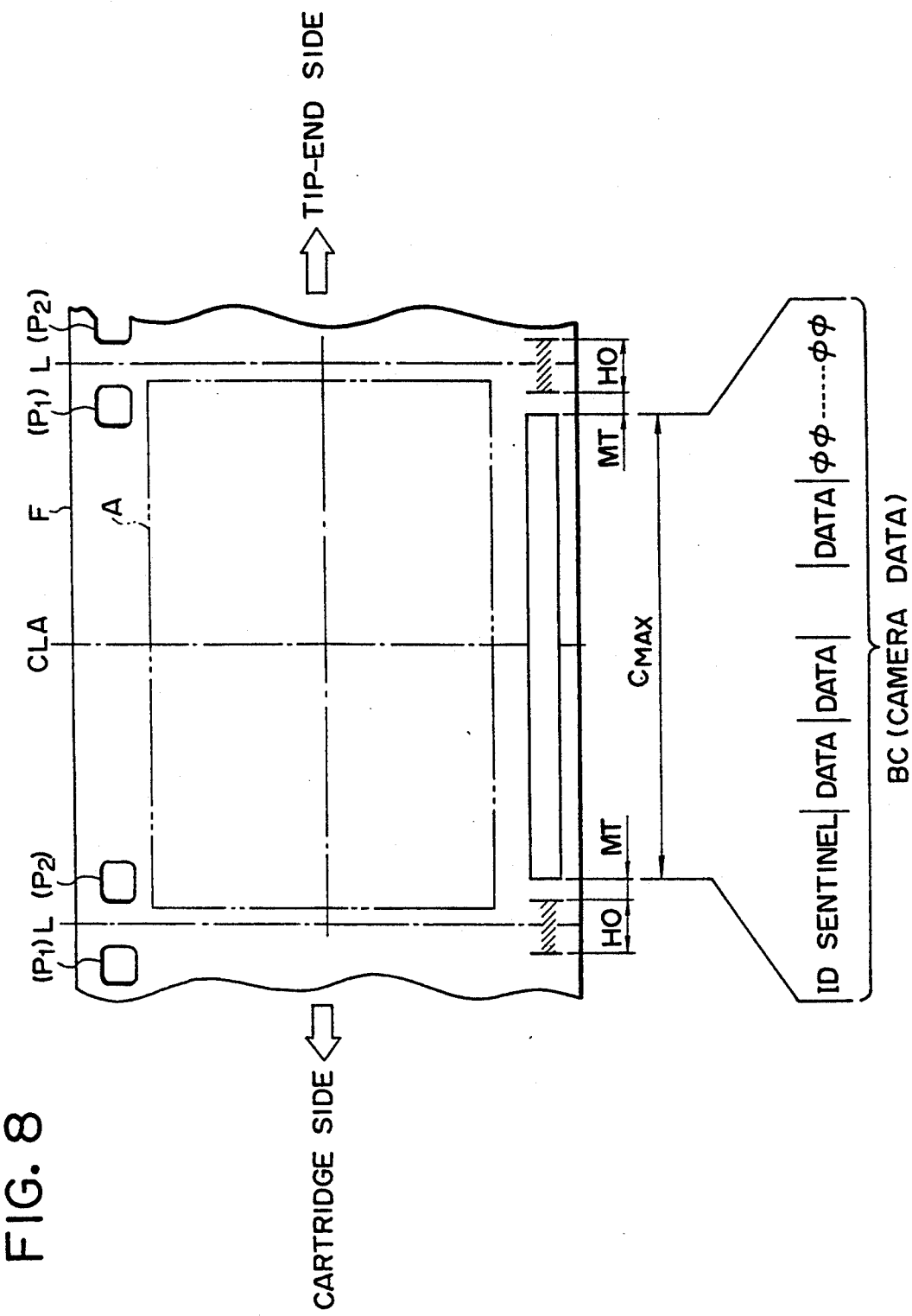
FIG. 8 is a drawing as seen from the base surface to show the longest length of camera data written on the film of FIG. 1.
Figure 9:
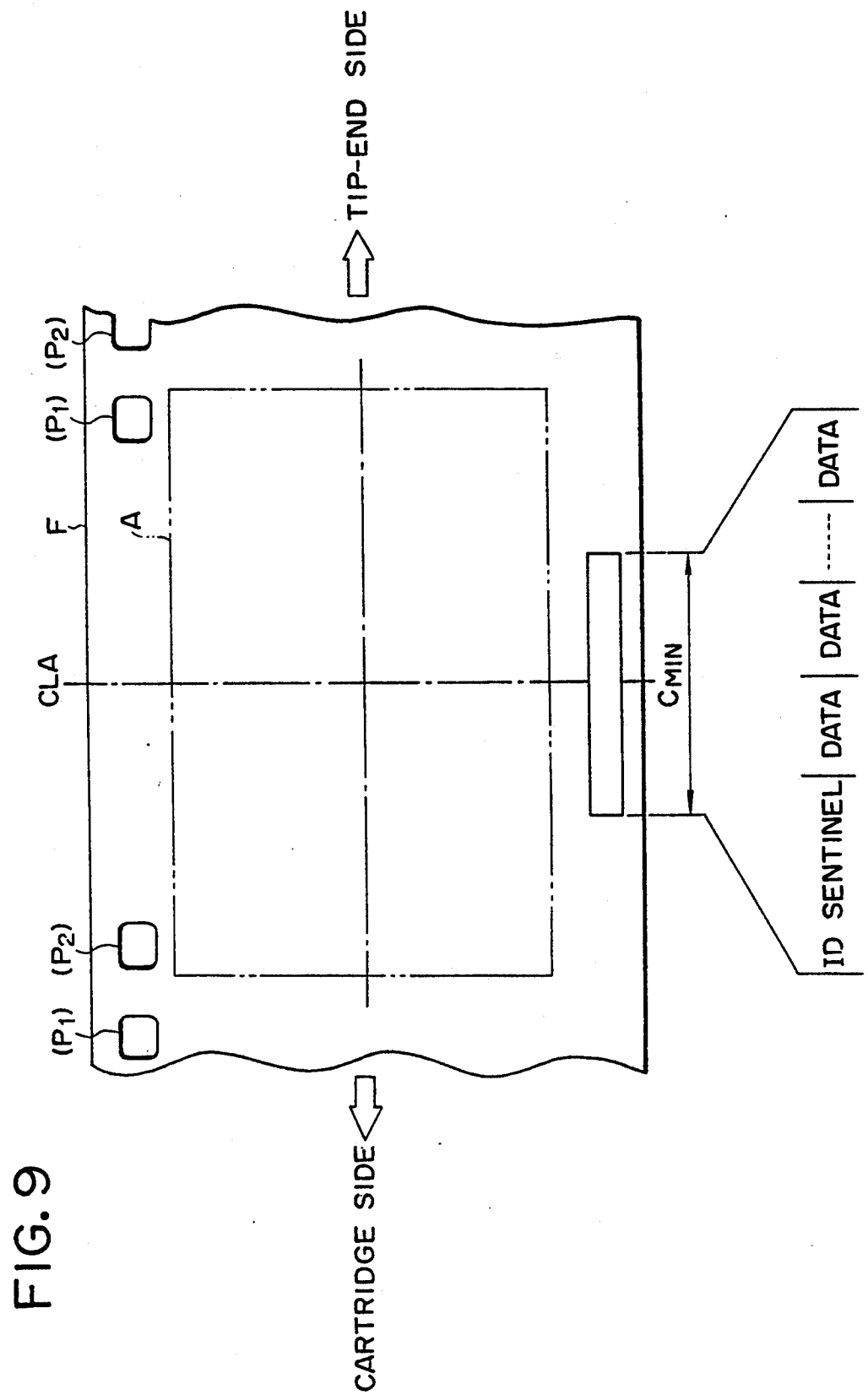
FIG. 9 is a drawing as seen from the base surface to show the shortest length of camera data written on the film of FIG. 1.

The following explains with FIG. 7 to FIG. 9 the details of the specific ID sentinels and the camera data written by the camera.

FIG. 7 is a drawing as seen from the base surface to show an unexposed frame halfway rewound in a film F with arrangement of an information track TC written by the camera on the magnetic record portion T and a structure of specific ID sentinels recorded in the information track TC.

The information track TC is arranged along the film F.

Continuous specific ID sentinels are recorded from the film tip end side toward the film cartridge C as shown for unexposed frames halfway rewound, in which vertical lines represent respective head bits of ID sentinels. In this example, fifteen specific ID sentinels are included in a pitch (a frame) of the perforations $P_1$, $P_2$.

In this example, an orientation of the specific ID sentinels is opposite to that of the other camera data as will be described. Thus, it is needless to mention that the specific ID sentinels must have a bit order different from any bit strings which could be formed when the ID sentinels and data characters of camera data are reproduced in the backward direction.

FIG. 8 and FIG. 9 are drawings as also seen from the base surface similarly as in FIG. 7, to respectively show a length of the camera data such as the shutter speed and the aperture value recorded on the information track TC in one frame in photographing on the film F.

In FIG. 8, L is a boundary between photographic frames (photographed frames), which is a reference position of the head Gap in the magnetic head H. Further, HO is both side freedom (head offset) of the head position, and MT is a dispersion in positioning of frame feed. Accordingly, the maximum or longest length $C_{MAX}$ of the camera data which can be written on the magnetic track TC is Given by the following equation.

$$C_{MAX} = L - (HO + 2MT)$$
$$= \text{one frame length} - (\text{head freedom} + \text{frame feed tolerance})$$

In the equation, L means a length between "L—L" in FIG. 8. Each camera data block BC is composed of N bit ID sentinels different from the specific ID sentinels in the reverse direction, following data characters, and binary 0's following the data characters and filling the remaining portion in the block. The longest length $C_{MAX}$ of the camera data block BC in which the camera data can be written on the magnetic track T in one frame is defined as a region beyond which any camera must not write the camera data. This regulation may prevent overlap of data written by cameras satisfying the condition of the head offset HO. The longest length $C_{MAX}$ which can be written is preferably symmetric with respect to the screen center CLA.

In FIG. 9, $C_{MAX}$ is a minimum or shortest length in which camera data block BC can be written on the information track TC in one frame, which can be the minimum as shown or which can be adjusted with 0's as in FIG. 8, taking other conditions into consideration. The minimum length $C_{MIN}$ in which the camera data block BC can be written is a region into which all cameras must write the data. The minimum length $C_{MIN}$ in which the data block can be written is also preferably symmetric with respect to the screen center CLA.

The above camera data is written on the magnetic record portion T of film F in which no data is recorded, in an unused film as shown in FIG. 8 or FIG. 9, thereby forming the information track TC. If a film cartridge halfway used is reloaded, the camera data is overwritten on the information track TC formed by recording the specific ID sentinels.

Figure 10A:
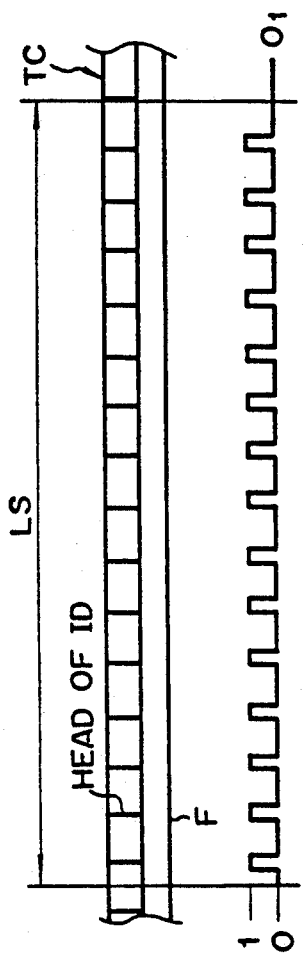
FIGS. 10A to 10C are drawings to illustrate a judging method to judge whether a frame is exposed or unexposed through specific ID sentinel detection in the first embodiment according to the present invention.
Figure 10B:
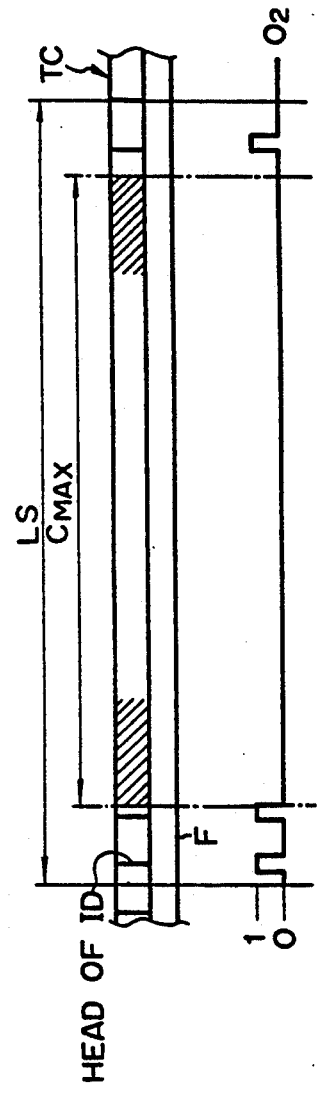
Figure 10C:
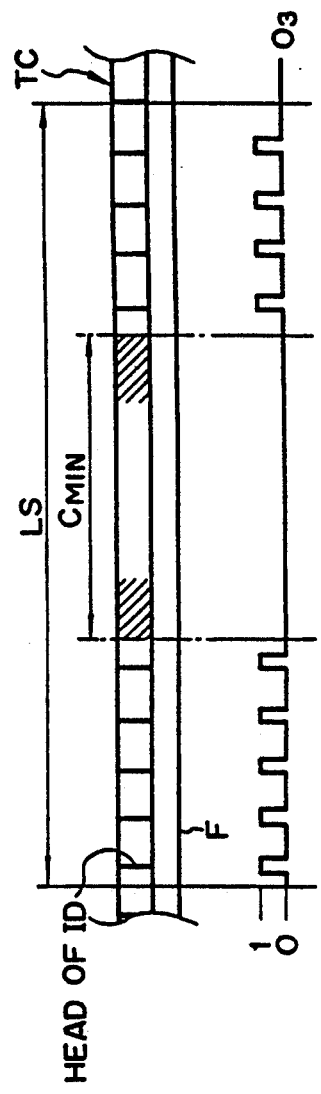

Next explained with FIGS. 10A to 10C is the method of judging if a frame is "exposed" or "unexposed" by detecting the specific ID sentinels recorded by a camera.

In FIGS. 10A to 10C, LS is a scan region of the magnetic head H in one frame. If the difference of head position depending upon cameras is within the offset HO, there is no overlap between written data. Thus, the scan area may be considered as one frame total length.

In FIG. 10A shows an "unexposed" frame in which serial specific ID sentinels are written in a film F halfway rewound. In FIG. 10A, $O_1$ is a detection output of the "unexposed" frame with the specific ID sentinels as shown, in the ID detection circuit 21.

In FIG. 10B shows an "exposed" frame in a reloaded cartridge, in which camera data is written in the maximum length $C_{MAX}$ on the information track TC in which the serial specific ID sentinels have been recorded. In FIG. 10B, $O_2$ is a detection output of the "exposed" frame with the specific ID sentinels as shown, in the ID detection circuit 21.

In FIG. 10C shows an "exposed" frame in a reloaded cartridge, in which camera data is written in the minimum length $C_{MAX}$ on the information track TC in which the serial specific ID sentinels have been recorded. In FIG. 10C, $O_3$ is a detection output of the "exposed" frame with the specific ID sentinels as shown, in the ID detection circuit 21.

As seen from the output $O_3$ detected by the ID detection circuit 21, the maximum specific ID sentinel number (as will be referred to as ID number) is nine in the "exposed" frame. Considering that no specific ID sentinel is recorded in an exposed frame in an unused film cartridge, the following judgement can be made:

If ID number is 0 to 9, "exposed" frame;

If ID number is 10 to 15, "unexposed" frame. The ID number detected would decrease with a reproduction error, but a correct judgement can be done if ten sentinels could be detected out of fifteen ID sentinels for an "unexposed" frame. This means that the probability of correct judgement is improved very much even with a low reproduction error rate, as compared to the conventional methods. As for an "exposed" frame, a decrease in detection of ID number causes no problem at all. Incidentally, the number of specific ID sentinels recorded for each frame is plural, specifically fifteen. The writing of the specific ID sentinels is carried out at Steps 119 and 127 in FIG. 4.

Second Embodiment

FIG. 11 to FIG. 13C are drawings to show a second embodiment according to the present invention, in which the operation executed with an unused film cartridge is the same as in the first embodiment.

Figure 11:
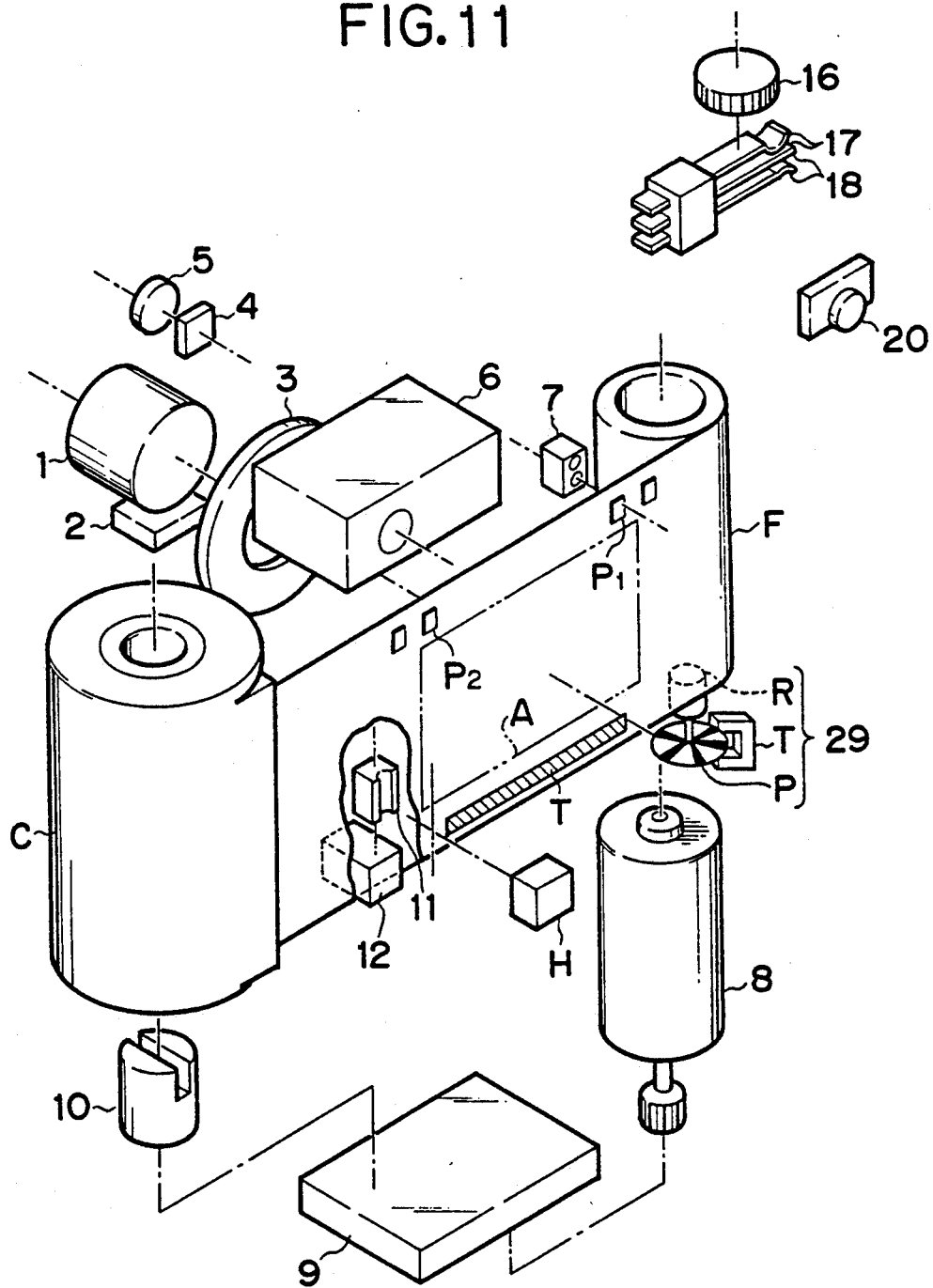
FIG. 11 is a perspective view to show a mechanical structure of a camera in a second embodiment according to the present invention.
Figure 12:
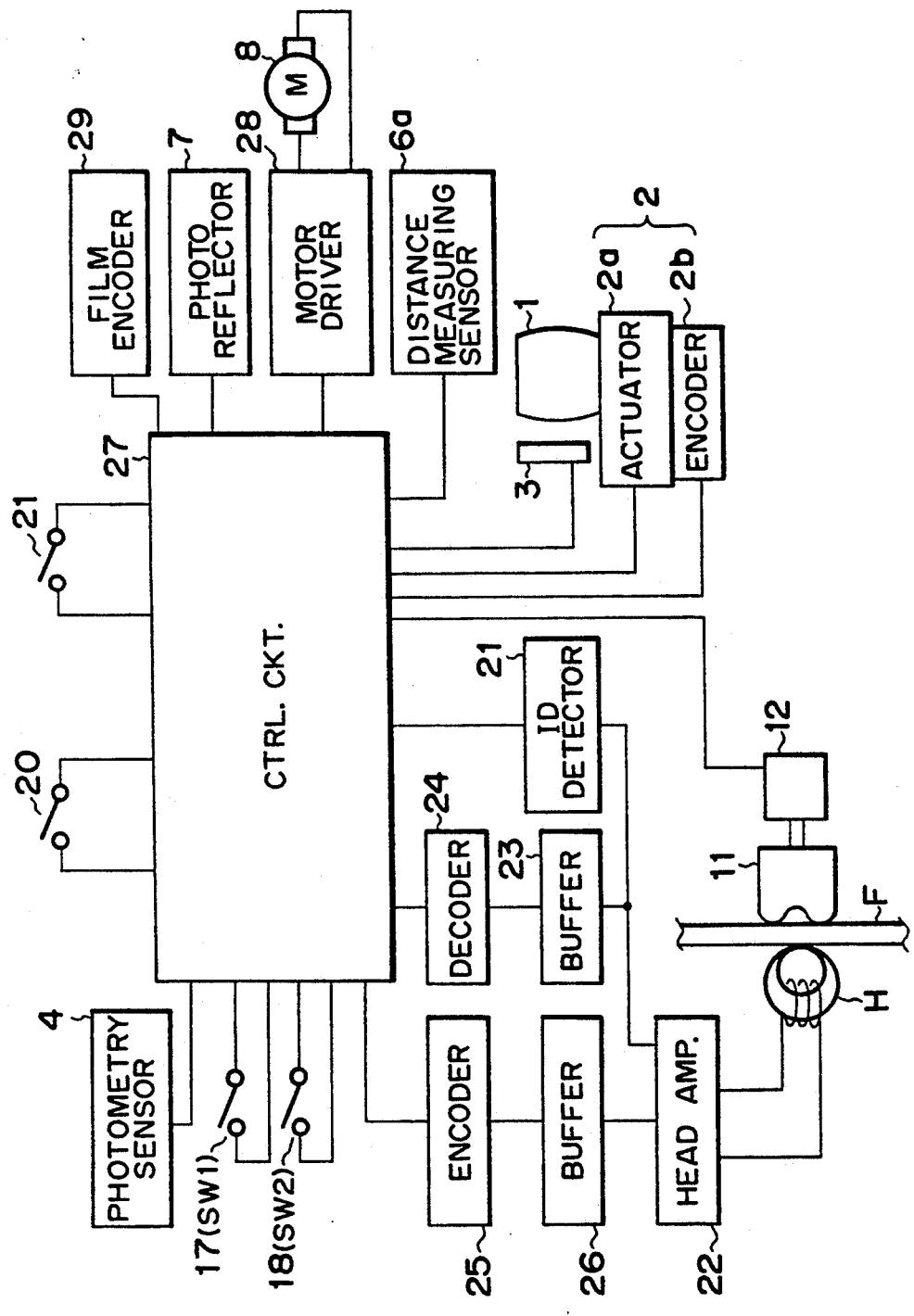
FIG. 12 is a block diagram in the camera of FIG. 10.

In the second embodiment, a film encoder 29 is provided for detecting a feed length in film one frame feed more finely (see FIG. 11 and FIG. 12). The film encoder 29 consists of a roller R rotated while contacting with the film F, a pulse plate P integrally rotating with the roller R and having a pattern in which transparent portions and opaque portions are alternate at equal intervals, and a photo interrupter I for counting a rotation amount of the pulse plate P. If the camera is of normal wind type, the magnetic head H and the pad 11 are to be located at a position symmetric with respect to the screen center.

In the above arrangement, in the case that a film cartridge halfway rewound is reloaded, the feed length of film F is monitored by the film encoder 29, and the ID number is detected only in the camera data writable minimum length $C_{MAX}$ on the information track TC in which the specific ID sentinels have been recorded for each frame, to Judge whether a frame is "exposed" or "unexposed".

Figure 13A:
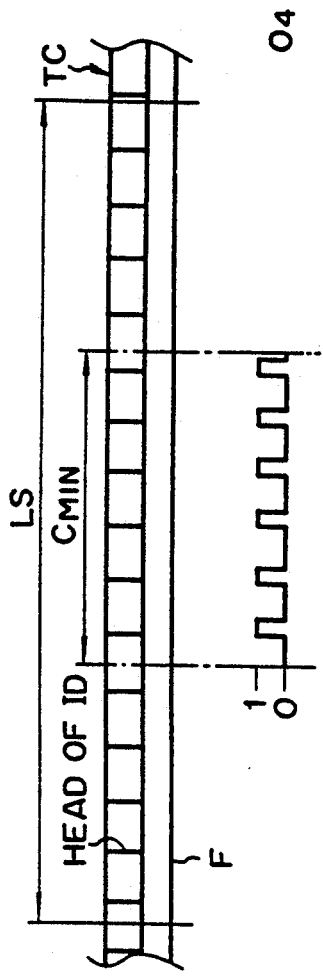
FIGS. 13A to 13C are drawings to illustrate a judgement method to judge whether a frame is exposed or unexposed through specific ID sentinel detection in the second embodiment according to the present invention.
Figure 13B:
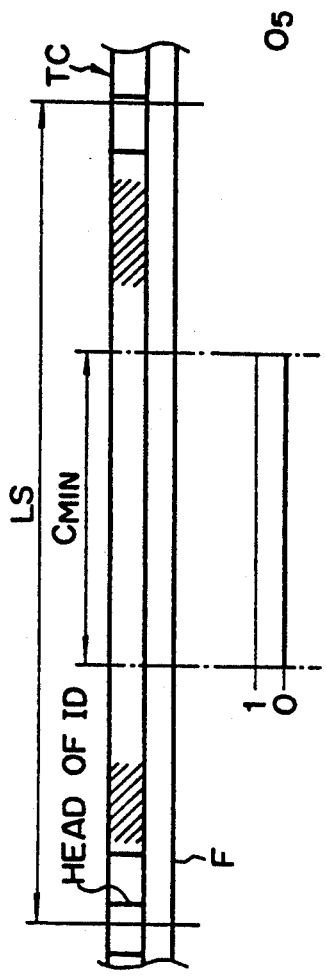
Figure 13C:
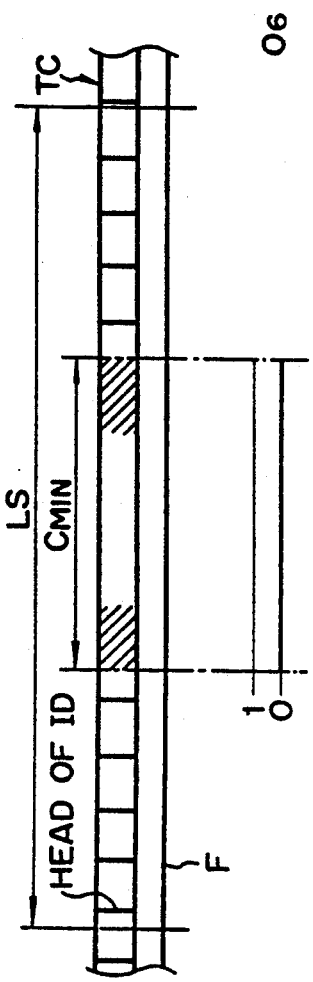

In FIGS. 13A to 13C, the camera data writable minimum length $C_{MIN}$ is the detection area.

FIG. 13A shows an "unexposed" frame in which serial specific ID sentinels are written, in a film F halfway rewound. In FIG. 13A, $O_4$ is a detection output of the "unexposed" frame in the ID detection circuit 21.

FIG. 13B shows an "exposed" frame in the reloaded cartridge, in which the camera data is written in the writable maximum length $C_{MAX}$ on the information track in which serial specific ID sentinels have been recorded. In FIG. 13B, $O_5$ is a detection output of the "exposed" frame in the ID detection circuit 21.

In FIG. 13C shows an "exposed" frame in the reloaded cartridge, in which the camera data is written in the writable minimum length $C_{MIN}$ on the information track in which serial specific ID sentinels have been recorded. In FIG. 13C, $O_6$ is a detection circuit of the "exposed" frame in the ID detection circuit 21.

As seen from FIGS. 13A to 13C, there is no specific ID sentinel detected from the "exposed" frame. Therefore, the ID number can be determined as follows:

If ID number is 0, "exposed" frame;

If ID number is one or more, "unexposed" frame.

One of six ID sentinels is enough for detection of "unexposed" frame, as shown in FIG. 13A.

In the above embodiments as described, a plurality of serial specific ID sentinels are written on the magnetic record portion for each unexposed frame when a film halfway used is taken out of the camera. If the film is reloaded in the camera, the number of the specific ID sentinels is compared with the predetermined number for each frame, to determine if a frame is "exposed" or "unexposed". This arrangement needs no preliminary record of data for judging if a frame is unexposed or exposed, in the magnetic record portion during the film production process, as being the case in the conventional methods, thereby avoiding an increase in the production cost of film.

Further, a plurality of specific ID sentinels are written for each unexposed frame upon halfway removal of the cartridge. When this film is reloaded for photographing, the camera data is overwritten on the specific ID sentinels for each photograph. It is judged as described whether a frame is "exposed" or "unexposed" by judging whether the ID number is more than the predetermined number or not for each frame. Even if a Judgement error is to be caused by a reproduction error, a possible misjudgement is that an "unexposed" frame is deemed as an "exposed" frame, securely avoiding the double exposure.

What is claimed is:

1. A camera using a film with a record portion for each frame therein and having film feed means for feeding the film frame by frame and for rewinding the film halfway up an end thereof, comprising:

a recording processing portion for performing information recording to a record portion of each frame;

instructing means for instructing halfway rewinding of said film; and control means for effecting such a control that said record processing portion records plural pieces of specific information in the record portion of each unexposed frame, when said instructing means instructs the halfway rewinding.

2. A camera according to claim 1, wherein said camera is a normal film feed camera in which said film feed means feeds the film frame by frame out of a cartridge in photographing and retracts the film into the cartridge in rewinding, wherein said film feed means feeds all unexposed frames out of the cartridge in said halfway rewinding and then retracts the film into the cartridge, and wherein said control means makes said processing portion record said specific information pieces in said record portion of each unexposed frame when said unexposed frames are fed out of the cartridge.

3. A camera according to claim 1, wherein said camera is a prewind film feed camera in which all frames are first fed out of a film cartridge and the film is retracted frame by frame into the cartridge in photographing, and wherein said control means makes said processing portion record said specific information pieces in said record portion of each unexposed frame when the unexposed frames are retracted into the cartridge.

4. A camera according to claim 1, wherein said processing portion records information other than said specific information in said record portion in frame feed after each exposure.

5. A camera according to claim 2, wherein said processing portion records information other than said specific information in said record portion in frame feed after each exposure.

6. A camera according to claim 3, wherein said processing portion records information other than said specific information in said record portion in frame feed after each exposure.

7. A camera according to claim 1, wherein said control means effects such a control that said processing portion records specific information in a record portion provided at a tip end of the film, when said instructing means instructs the halfway rewinding.

8. A camera according to claim 4, wherein said control means effects such a control that said processing portion records specific information in a record portion provided at a tip end of the film, when said instructing means instructs the halfway rewinding.

9. A camera according to claim 1, wherein said camera has reading means for reading information recorded in the record portion of each frame through said processing portion in film feed after the film cartridge is mounted, and judging means for judging whether the information read by said reading means is said specific information, thereby to judge whether a frame in the feeding film is unexposed.

10. A camera according to claim 2, wherein said camera has reading means for reading information recorded in the record portion of each frame through said processing portion in film feed after the film cartridge is mounted, and judging means for judging whether the information read by said reading means is said specific information, thereby to judge whether a frame in the feeding film is unexposed.

11. A camera according to claim 10, wherein said camera continues feeding the film before a Judgement of the specific information is made by said Judging means in film feed.

12. A camera according to claim 3, wherein said camera has reading means for reading information recorded in the record portion of each frame through said processing portion in film feed after the film cartridge is mounted, and judging means for Judging whether the information read by said reading means is said specific information, thereby to judge whether a frame in the feeding film is unexposed.

13. A camera according to claim 12, wherein said camera continues feeding the film as long as said Judging means judges that the information read is the specific information in film feed, after the film cartridge is mounted.

14. A camera according to claim 9, wherein said Judging means judges whether a number of the specific information pieces read from a frame is larger than a predetermined number, whereby judging whether the frame is unexposed.

15. A camera according to claim 14, wherein said predetermined number is zero.

16. A camera according to claim 7, wherein said camera has judging means, which, when the information in the record portion at the tip end of film is the specific information in film feed after a film cartridge is mounted, judges that said cartridge is a cartridge once rewound.

17. A camera using a film with a magnetic record portion for each frame therein and having film fed means for feeding the film frame by frame and for rewinding the film halfway up an end thereof, comprising:
 a magnetic head portion for performing information recording to a magnetic record portion of each frame;
 instructing means for instructing halfway rewinding of said film; and
 control means for effecting such a control that said magnetic head portion records plural pieces of specific information in the magnetic record portion of each unexposed frame, when said instructing means instructs the halfway rewinding.

18. A camera according to claim 17, wherein said camera is a normal film feed camera in which said film feed means feeds the film frame by frame out of a cartridge in photographing and retracts the film into the cartridge in rewinding, wherein said film feed means feeds all unexposed frames out of the cartridge in said halfway rewinding and then retracts the film into the cartridge, and wherein said control means makes said magnetic head portion record said specific information pieces in said magnetic record portion of each unexposed frame when said unexposed frames are fed out of the cartridge.

19. A camera according to claim 17, wherein said camera is a prewind film feed camera in which all frames are first fed out of a film cartridge and the film is retracted frame by frame into the cartridge in photographing, and wherein said control means makes said magnetic head portion record said specific information pieces in said magnetic record portion of each unexposed frame when the unexposed frames are retracted into the cartridge.

20. A camera according to claim 17, wherein said magnetic head portion records information other than said specific information in said magnetic record portion in frame feed after each exposure.

21. A camera according to claim 18, wherein said magnetic head portion records information other than said specific information in said magnetic record portion in frame feed after each exposure.

22. A camera according to claim 19, wherein said magnetic head portion records information other than said specific information in said magnetic record portion in frame feed after each exposure.

23. A camera according to claim 17, wherein said control means effects such a control that said magnetic-head portion records specific information in a magnetic record portion provided at a tip end of the film, when said instructing means instructs the halfway rewinding.

24. A camera according to claim 20, wherein said control means effects such a control that said magnetic head portion records specific information in a magnetic record portion provided at a tip end of the film, when said instructing means instructs the halfway rewinding.

25. A camera according to claim 17, wherein said camera has reading means for reading information recorded in the magnetic record portion of each frame through said magnetic head portion in film feed after the film cartridge is mounted, and judging means for judging whether the information read by said reading means is said specific information, thereby to judge whether a frame in the feeding film is unexposed.

26. A camera according to claim 18, wherein said camera has reading means for reading information recorded in the magnetic record portion of each frame through said magnetic head portion in film feed after the film cartridge is mounted, and judging means for Judging whether the information read by said reading means is-said specific information, thereby to judge whether a frame in the feeding film is unexposed.

27. A camera according to claim 26, wherein said camera continues feeding the film before a judgement of the specific information is made by said Judging means in film feed.

28. A camera according to claim 19, wherein said camera has reading means for reading information recorded in the magnetic record portion of each frame through said magnetic head portion in film feed after the film cartridge is mounted, and Judging means for judging whether the information read by said reading means is said specific information, thereby to judge whether a frame in the feeding film is unexposed.

29. A camera according to claim 28, wherein said camera continues feeding the film as long as said judging means judges that the information read is the specific information in film feed, after the film cartridge is mounted.

30. A camera according to claim 25, wherein said judging means judges whether a number of the specific information pieces read from a frame is larger than a predetermined number, whereby judging whether the frame is unexposed.

31. A camera according to claim 30, wherein said predetermined number is zero.

32. A camera according to claim 23, wherein said camera has judging means, which, when the information in the magnetic record portion at the tip end of film is the specific information in film feed after a film cartridge is mounted, judges that said cartridge is a cartridge once rewound.

* * * * *

UNITED STATES PATENT AND TRADEMARK OFFICE
CERTIFICATE OF CORRECTION

PATENT NO. : 5,325,138
DATED : June 28, 1994
INVENTOR(S) : TORU NAGATA

It is certified that error appears in the above-indentified patent and that said Letters Patent is hereby corrected as shown below:

ON COVER PAGE:

At [57] Under Heading "ABSTRACT":
    Line 1, "magnet" should read --magnetic--.

IN THE DRAWINGS:
    Fig. 2, Sheet 2 of 14, (in the box labeled 7), "REFRECTOR should read --REFLECTOR--.

COLUMN 1:
    Line 42, "Judged" should read --judged--; and
    Line 46, "from film winding through" should read --film winding from--.

COLUMN 2:
    Line 22, "Judged" should read --judged--; and
    Line 47, "is" should read --are--.

COLUMN 3:
    Line 46, "photomerry" should read --photometry--; and
    Line 47, "photomerry" should read --photometry--.

COLUMN 4:
    Line 11, "photomerry" should read --photometry--;
    Line 24, "micro com-" should read --microcom- --; and
    Line 50, "is detected-" should read --are detected.--.

UNITED STATES PATENT AND TRADEMARK OFFICE
CERTIFICATE OF CORRECTION

PATENT NO. : 5,325,138
DATED : June 28, 1994
INVENTOR(S) : TORU NAGATA

Page 2 of 4

It is certified that error appears in the above-indentified patent and that said Letters Patent is hereby corrected as shown below:

COLUMN 5:
    Line 3, "is" (first occurrence) should read --are--;
    Line 5, "Goes" should read --goes--;
    Line 7, "Goes" should read --goes--;
    Line 13, "having" should read --being--;
    Line 19, "Goes" should read --goes--;
    Line 26, "photomerry" should read --photometry--;
    Line 28, "photomerry" should read --photometry--;
    Line 36, "Judged" should read --judged--;
    Line 47, "photomerry" should read --photometry--;
    Line 56, "feed" should read --feed,--; and
    Line 59, "Judged" should read --judged--.

COLUMN 6:
    Line 4, "frame" should read --frames--;
    Line 25, "Judged" should read --judged--;
    Line 35, "Judged" should read --judged--;
    Line 40, "Judged" should read --judged--;
    Line 41, "Judged" should read --judged--;
    Line 58, "Judged" should read --judged--; and
    Line 62, "Judged" should read --judged--.

COLUMN 7:
    Line 20, "Goes" should read --goes--;
    Line 26, "is" should read --are--;
    Line 37, "same two digits from the lowest" should read --same two lowest digits--;
    Line 50, "is" should read --are--; and
    Line 56, "Judged" should read --judged--.

UNITED STATES PATENT AND TRADEMARK OFFICE
CERTIFICATE OF CORRECTION

PATENT NO. :  
DATED :  5,325,138  
INVENTOR(S) :  June 28, 1994  
TORU NAGATA

Page 3 of 4

It is certified that error appears in the above-indentified patent and that said Letters Patent is hereby corrected as shown below:

COLUMN 8:
    Line 36, "Judged" should read --judged--; and  
    Line 41, "Judged" should read --judged--.

COLUMN 9:
    Line 18, "Gap" should read --gap--;  
    Line 23, "Given" should read --given--; and  
    Line 45, "$C_{MAX}$" should read --$C_{MIN}$--.

COLUMN 10:
    Line 3, "In" should be deleted;  
    Line 8, "In" should be deleted;  
    Line 15, "In" should be deleted;  
    Line 17, "$C_{MAX}$" should read --$C_{MIN}$--;  
    Line 55, "alternate" should read --alternated--;  
    Line 65, "$C_{MAX}$" should read --$C_{MIN}$--; and  
    Line 68, "Judge" should read --judge--.

COLUMN 11:
    Line 13, "In" should be deleted;  
    Line 34, "Judging" should read --judging--;  
    Line 47, "Judgement" should read --judgement--; and  
    Line 56, "recording" should read --record--.

COLUMN 12:
    Line 56, "Judgement" should read --judgement--;  
    Line 57, "Judging" should read --judging--  
    Line 63, "Judging" should read --judging--; and  
    Line 68, "Judg-" should read --judg- --.

UNITED STATES PATENT AND TRADEMARK OFFICE
CERTIFICATE OF CORRECTION

PATENT NO. :
DATED       :    5,325,138
INVENTOR(S) :    June 28, 1994
                 TORU NAGATA It is certified that error appears in the above-indentified patent and that said Letters Patent is hereby corrected as shown below:

COLUMN 13:
    Line 5, "Judging" should read --judging--; and
    Line 18, "fed" should read --feed--.

COLUMN 14:
    Line 6, "magnetic-" should read --magnetic--;
    Line 28, "Judging" should read --judging--;
    Line 29, "is-said" should read --is said--;
    Line 33, "Judging" should read --judging--; and
    Line 39, "Judging" should read --judging--.

Signed and Sealed this

Thirty-first Day of January, 1995

Attest:

BRUCE LEHMAN

*Attesting Officer*    *Commissioner of Patents and Trademarks*